United States Patent
Song et al.

(10) Patent No.: US 9,571,830 B2
(45) Date of Patent: Feb. 14, 2017

(54) METHOD AND DEVICE FOR ENCODING/DECODING IMAGE BY INTER PREDICTION USING RANDOM BLOCK

(71) Applicant: SK TELECOM CO., LTD., Seoul (KR)

(72) Inventors: Jinhan Song, Seoul (KR); Jeongyeon Lim, Gyeonggi-do (KR); Yunglyul Lee, Seoul (KR); Joohee Moon, Seoul (KR); Haekwang Kim, Seoul (KR); Byeungwoo Jeon, Seongnam-si (KR); Jongki Han, Seoul (KR); Jaehee Cho, Seoul (KR); Hyundong Kim, Seoul (KR); Daeyeon Kim, Seoul (KR); Sungwook Hong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 838 days.

(21) Appl. No.: 13/909,515

(22) Filed: Jun. 4, 2013

(65) Prior Publication Data

US 2013/0266067 A1 Oct. 10, 2013

Related U.S. Application Data

(63) Continuation of application No. PCT/KR2011/009394, filed on Dec. 6, 2011.

(30) Foreign Application Priority Data

Dec. 6, 2010 (KR) .................. 10-2010-0123512

(51) Int. Cl.
*H04N 19/61* (2014.01)
*H04N 19/50* (2014.01)
(Continued)

(52) U.S. Cl.
CPC ...... *H04N 19/00569* (2013.01); *H04N 19/109* (2014.11); *H04N 19/119* (2014.11);
(Continued)

(58) Field of Classification Search
None
See application file for complete search history.

(56) References Cited

U.S. PATENT DOCUMENTS

| | | | |
|---|---|---|---|
| 2004/0081238 A1* | 4/2004 | Parhy .................. | H04N 19/51 375/240.16 |
| 2006/0274956 A1* | 12/2006 | Sohn .................... | H04N 19/176 382/238 |
| 2009/0067504 A1* | 3/2009 | Zheludkov ............ | H04N 19/56 375/240.16 |

FOREIGN PATENT DOCUMENTS

| | | |
|---|---|---|
| KR | 1019970025163 | 5/1997 |
| KR | 1019970025172 | 5/1997 |
| KR | 1020070047523 | 5/2007 |

OTHER PUBLICATIONS

International Search Report mailed Jun. 29, 2012 for PCT/KR2011/009394.

* cited by examiner

*Primary Examiner* — Eileen Adams
(74) *Attorney, Agent, or Firm* — Hauptman Ham, LLP

(57) ABSTRACT

A video encoding apparatus, a video decoding apparatus and method of encoding and decoding one or more images using various shapes of blocks. The video encoding apparatus is configured to determine a partition form, among candidate partition forms, for partitioning a current block into one or more partition blocks; generate one or more predicted blocks by performing a motion compensation with a scale factor applied to the one or more partition blocks; generate a residual block by subtracting the predicted blocks from the
(Continued)

corresponding one or more partition blocks; generate at least one transform block by transforming the residual block; generate at least one quantized transform block by quantizing the at least one transform block; and encode the at least one quantized transform block, information on the determined partition form, and the scale factor into a bitstream.

7 Claims, 13 Drawing Sheets

(51) Int. Cl.
*H04N 19/176* (2014.01)
*H04N 19/119* (2014.01)
*H04N 19/147* (2014.01)
*H04N 19/109* (2014.01)
H04N 19/523 (2014.01)

(52) U.S. Cl.
CPC ......... *H04N 19/147* (2014.11); *H04N 19/176* (2014.11); *H04N 19/61* (2014.11); H04N 19/523 (2014.11)

METHOD AND DEVICE FOR ENCODING/DECODING IMAGE BY INTER PREDICTION USING RANDOM BLOCK

CROSS-REFERENCE TO RELATED APPLICATION

The present application is a continuation of International Patent Application No. PCT/KR2011/009394, filed Dec. 6, 2011, which is based on and claims priority to Korean Patent Application No. 10-2010-0123512, filed on Dec. 6, 2010. The disclosures of the above-listed applications are hereby incorporated by reference herein in their entirety.

FIELD

The present disclosure relates to an apparatus and a method for encoding and/or decoding images by inter-prediction using arbitrary shapes of blocks.

BACKGROUND

The statements in this section merely provide background information related to the present disclosure and may not constitute prior art.

Moving Picture Experts Group (MPEG) and Video Coding Experts Group (VCEG) together stepped ahead of the existing MPEG-4 Part 2 and H.263 standard methods to develop a better and more excellent video compression technology. The new standard is called H.264/AVC (Advanced Video Coding) and was released simultaneously as MPEG-4 Part 10 AVC and ITU-T Recommendation H.264. H.264/AVC (hereinafter, referred to as "H.264") has promoted great development to improved picture quality and performance by using various encoding methods. Further, there is ongoing standardization meeting for the new standard covering picture quality in a high-definition (HD) level or more by a joint team of MPEG and VCEG called Joint Collaborative Team on Video Coding (JCT-VC).

A video encoding method divides an input image in units of blocks and predicts each block by subblock sizes according to an inter-prediction mode or an intra-prediction mode to generate a residual block, subjects the generated residual block to an integer transform designed based on a Discrete Cosine Transform (DCT) in units of 4×4 or 8×8 blocks to generate a transform coefficient, and then quantizes the transform coefficient according to a given Quantization Parameter (QP). Further, a blocking effect generated due to the transform process and the quantization process is reduced through loop filtering.

The inventor(s) has noted that to increase accuracy of a motion compensation performed in H.264/AVC, a method of finding a more accurate motion vector is used by searching for the motion vector not only in an integer sample having an integer pixel but also in the position of up to a sub sample having a resolution of a 1/8 sample in case of a luminance (luma) component.

The inventor(s) has experienced that fixed block sizes disable accurate predictions and compensations on pixels changing due to various motions across images, resulting in a decreased video encoding efficiency. That is, in predicting and compensating for various video motions such as zoom in and out, shaking, panning, rotation and the like, the inventor(s) has experienced that predictions would be efficiently performed with various shapes and sizes of blocks other than a 4×4 block size or a 8×8 block size. The inventor(s) has, however, experienced that the prediction and compensation method using fixedly sized blocks cannot encode videos adaptively to the video characteristics, thereby deteriorating the encoding efficiency.

SUMMARY

In accordance with some embodiments, a video encoding apparatus comprises a block partitioning unit, a prediction unit, a subtractor, a transformer, a quantizer, and an encoder. The block partitioning unit is configured to determine a partition form, among candidate partition forms, for partitioning a current block into one or more partition blocks. The prediction unit is configured to generate one or more predicted blocks by performing a motion compensation with a scale factor applied to the one or more partition blocks. The subtractor is configured to generate a residual block by subtracting the predicted blocks from the corresponding one or more partition blocks. The transformer is configured to generate at least one transform block by transforming the residual block. The quantizer is configured to generate at least one quantized transform block by quantizing the at least one transform block. And the encoder is configured to encode the at least one quantized transform block, information on the determined partition form, and the scale factor into a bitstream.

In accordance with some embodiments, a video decoding apparatus comprises a decoder, a dequantizer, an inverse transformer, a prediction unit, and an adder. The decoder is configured to reconstruct at least one quantized transform block, information on a partition form and a scale factor from a bitstream. The dequantizer is configured to reconstruct at least one transform block by dequantizing the at least one quantized transform block. The inverse transformer is configured to reconstruct a residual block based on inversely transforming the at least one transform block. The prediction unit is configured to generate one or more partitioned prediction blocks by using a partition form indicated by the information on the partition form among candidate partition forms and the scale factor, and then generate a prediction block by combining the one or more partitioned prediction blocks. The adder is configured to reconstruct a current block based on the reconstructed residual block and the prediction block.

In accordance with some embodiments, the video decoding apparatus performs a video decoding method. The video decoding apparatus is configured to reconstruct at least one quantized transform block, information on a partition form and a scale factor from a bitstream; reconstruct at least one transform block by dequantizing the least one quantized transform block; reconstruct a residual block based on inversely transforming the least one transform block; generate one or more partitioned prediction blocks by using a partition form indicated by the information on the partition form among candidate partition forms and the scale factor; generate a prediction block by combining the one or more partitioned prediction blocks; and generate a current block based on the reconstructed residual block and the prediction block.

DETAILED DESCRIPTION

Figure 1:
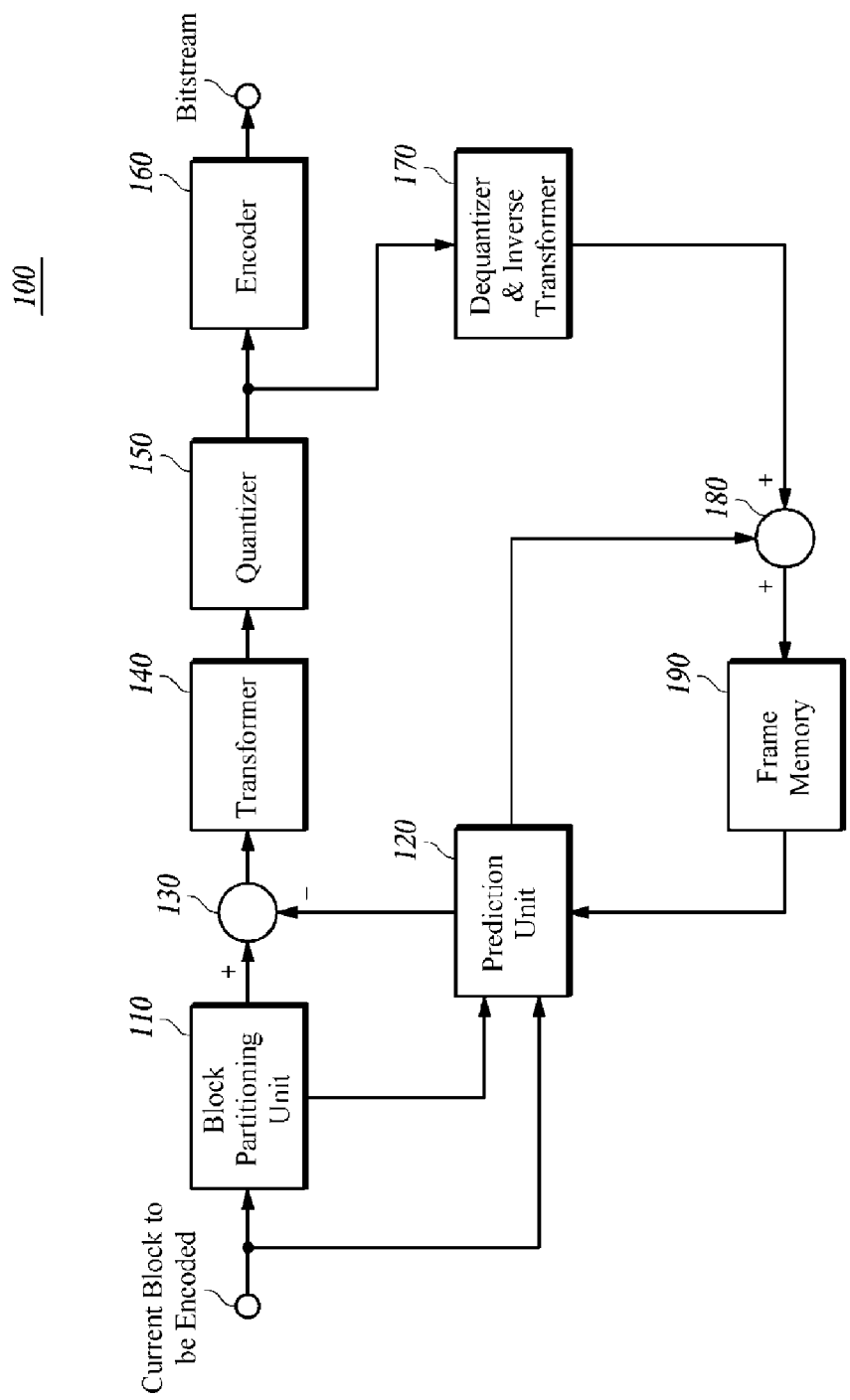
FIG. 1 is a schematic block diagram of a video encoding apparatus according to at least one embodiment of the present disclosure.

At least one embodiment of the present disclosure predicts a suitably shaped and sized current block of an image from a reference block before encoding and decoding the predicted current block to thereby minimize a difference between the original current block and the predicted current block and thereby increase the compression efficiency and improve the subjective picture quality. According to the present disclosure, there are effects of increasing a compression efficiency and improving subjective picture quality by minimizing a difference between an original current block and a predicted current block by predicting a shape and a size suitable for predicting a current block of a video (or at least one image) from a reference block and encoding and decoding the current block.

Hereinafter, a video encoding apparatus and a video decoding apparatus described below may be user terminals (or user equipment) such as a personal computer (PC), a notebook computer, personal digital assistant (PDA), portable multimedia player (PMP), PlayStation Portable (PSP), wireless communication terminal, smart phone, TV and the like, or server terminals such as an application server, service server and the like. Also the video encoding apparatus and the video decoding apparatus may correspond to various apparatuses including a communication apparatus such as a communication modem and the like for performing communication with various types of devices or a wired/wireless communication network, memory for storing various types of programs and data for encoding or decoding a video, or performing an inter or intra prediction for the encoding or decoding, and a microprocessor and the like for executing the program to perform an operation and control.

Further, a video encoded into a bitstream by the video encoding apparatus may be transmitted in real time or non-real-time to the video decoding apparatus through wired/wireless communication networks such as the Internet, wireless personal area network (WPAN), wireless local area network (WLAN), WiBro (wireless broadband, aka WiMax) network, mobile communication network and the like or through various communication interfaces such as a cable, a universal serial bus (USB) and the like, and then decoded in the video decoding apparatus and reconstructed and reproduced as the video.

A video typically may include a series of pictures, each of which is divided or partitioned into predetermined areas, such as frames or blocks. When the area of the video is partitioned into blocks, the partitioned blocks may be classified into an intra block or an inter block depending on an encoding method. The intra block means a block that is encoded through an intra prediction coding method. The intra prediction coding method generates a predicted block by predicting a pixel of a current block using pixels of a reconstructed block that underwent previous encoding and decoding in a current picture where the current encoding is performed, and then encodes differential values between pixesl of the predicted block and those of the current block. The inter block means a block that is encoded through an inter prediction encoding, which generates a predicted block by predicting a current block in a current picture through referencing one or more past pictures or future pictures and then encoding differential values of the predicted block from the current block. Here, the picture that is referenced in encoding or decoding the current picture is called a reference picture.

FIG. 1 is a schematic block diagram of a video encoding apparatus according to at least one embodiment of the present disclosure.

The video encoding apparatus 100 according to at least one embodiment of the present disclosure is for encoding a video by calculating a motion vector and a scale factor by using luminance components of a block to be currently encoded in the video. The video encoding apparatus 100 comprises a block partitioning unit 110, a prediction unit 120, a subtractor 130, a transformer 140, a quantizer 150, an encoder 160, a dequantizer and inverse transformer 170, an adder 180 and a frame memory 190 as illustrated in FIG. 1.

A video may be input in units of macroblocks, and in the present disclosure the macroblock may have an M×N shape, where M and N are the same or different number (or digit).

The block partitioning unit 110 partitions a current block to be encoded into one or more blocks having arbitrary shapes and selects a partition form of the block having an optimal encoding efficiency from the arbitrary shapes.

Figure 2:
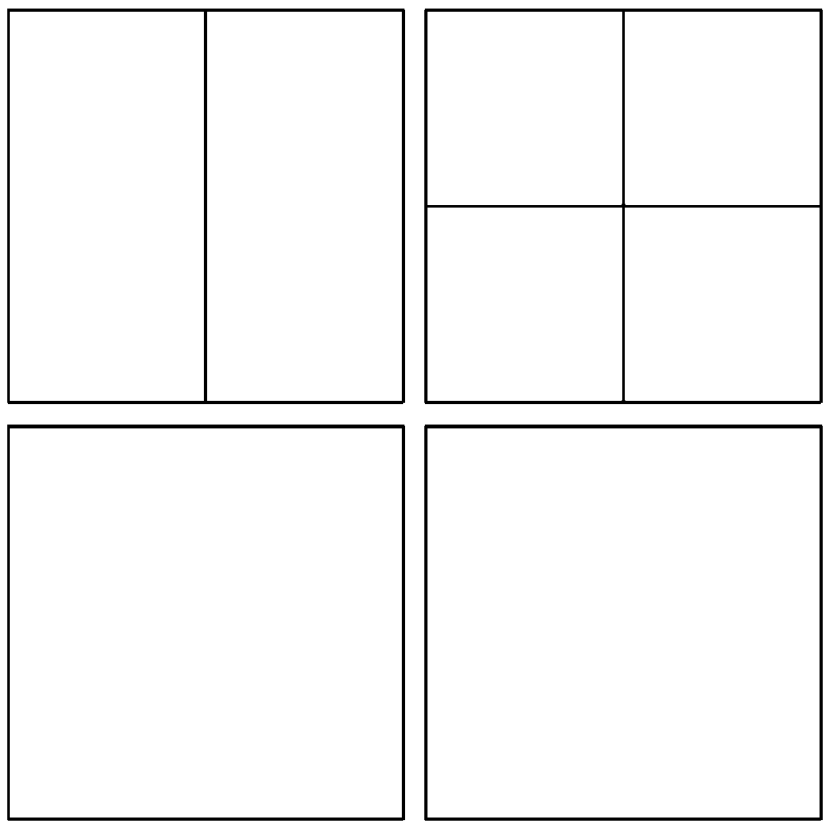
FIG. 2 is an exemplary diagram of a block partition form having a rectangular shape according to at least one embodiment of the present disclosure.
Figure 3:
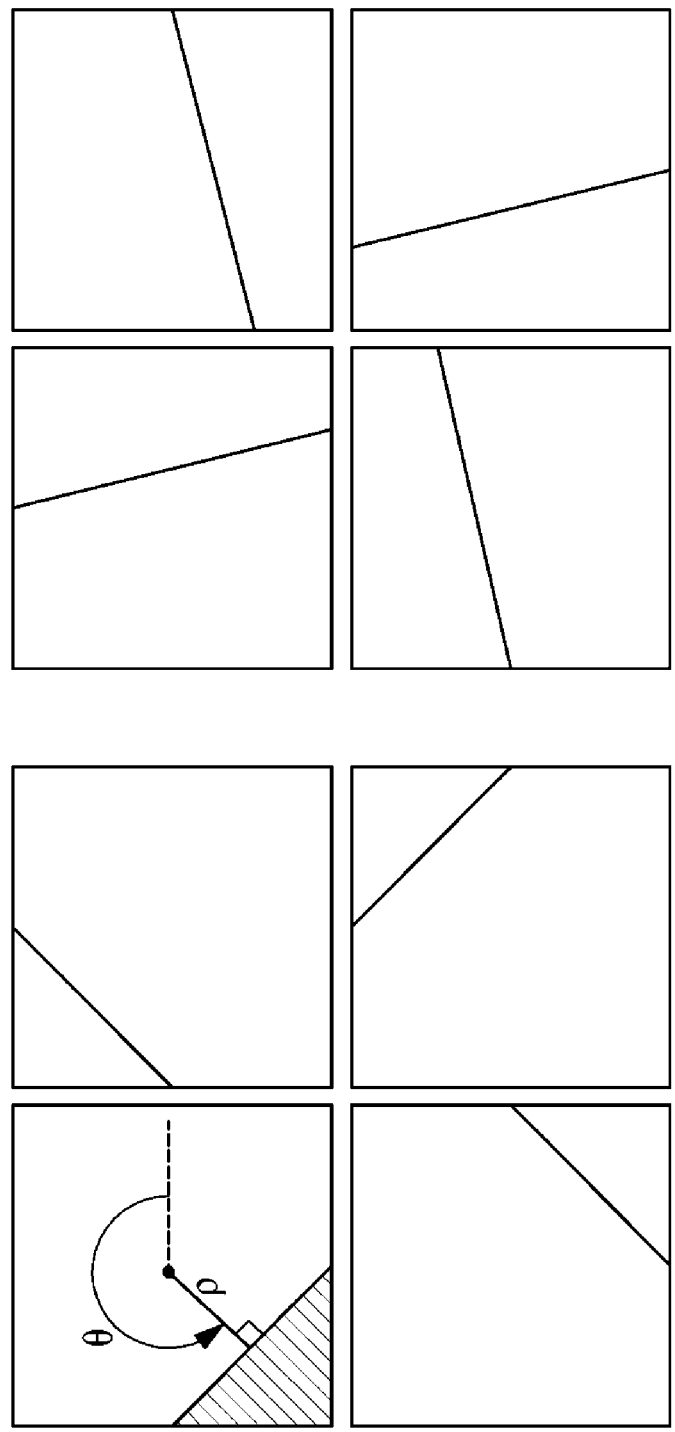
FIG. 3 is an exemplary diagram of various block partition forms having various available shapes according to at least one embodiment of the present disclosure.

FIG. 2 is a diagram illustrating an example of a block partition form having a rectangular shape according to at least one embodiment of the present disclosure, and FIG. 3 is a diagram illustrating examples of various block partition forms having various available shapes according to at least one embodiment of the present disclosure.

In order to partition the current block without limiting the partition form to the rectangular shape, a partition boundary may be determined by variously changing an angle and a length of the partition boundary (or a slope and a start position of the partition boundary (y-intercept or x-intercept)), or the partition boundary may be generated by connecting two arbitrary points of peripheral pixels in the block. A partition form having the best rate-distortion ratio can be the partition form of choice for encoding by comparing encoding costs among candidate partitions in arbitrary forms.

For example, when determining an angle (or slope) of the boundary (partition boundary) of the partitioned block in the 8×8 size block, the angle may refer to an angle (or slope) generated by connecting one arbitrary peripheral point of the block and other peripheral pixels over a span which represents a length (or intercept) of the partition boundary at the corresponding angle (or slope). The length can be expressed by the number of horizontal or vertical pixels of the corresponding partition boundary. In addition, the boundary of the partitioned block can be expressed by using the start position (that is, y-intercept or x-intercept) and the slope of the partition boundary. The partition boundary is calculated by Equation 1 below.

$$y=(-1/\tan \theta)x+p/\sin \theta=mx+c \qquad \text{Equation 1}$$

In Equation 1, $\theta$ denotes an angle of a straight line perpendicular to a line which partitions the block from a center point of the block, p denotes a length between the block partition line and the block center point, m denotes a slope of the straight block partition line, and c denotes a y-intercept of the straight block partition line.

Figure 4:
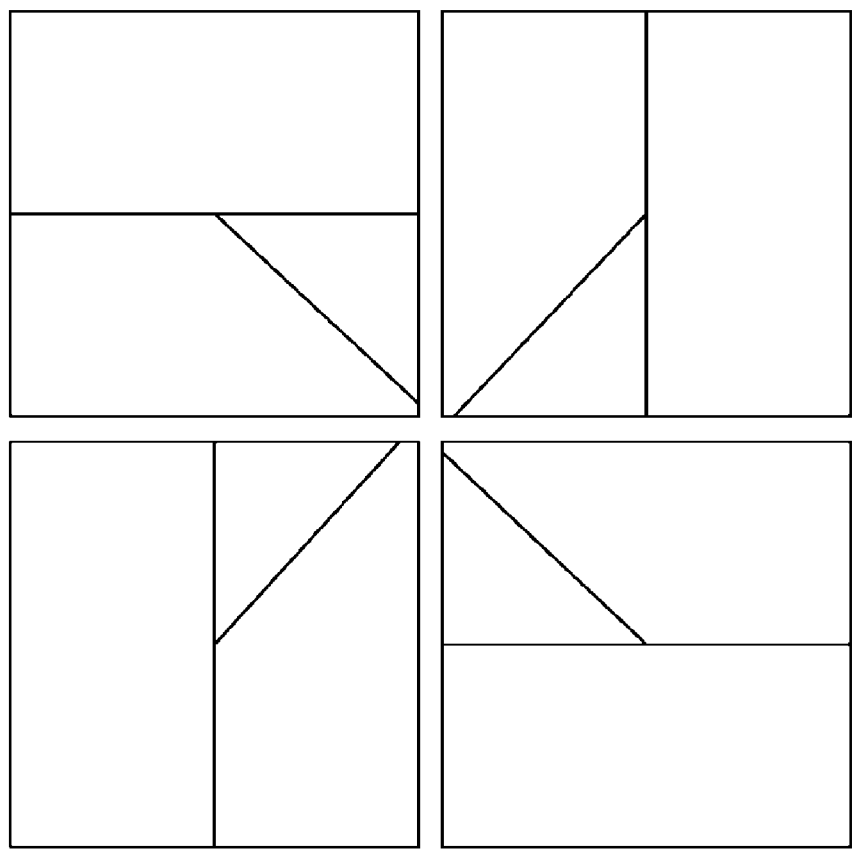
FIG. 4 is an exemplary diagram of illustrating at least one subblock having a rectangular shape is partitioned into arbitrary shapes of blocks according to at least one embodiment of the present disclosure.

FIG. 4 is a diagram illustrating an example where a subblock having a rectangular shape is partitioned into arbitrary shapes of blocks.

As illustrated in FIG. 4, with some of the partitioned blocks, the partition boundary can be determined among partition forms having various shapes.

Although the method of determining various partition boundaries has been illustrated, various embodiments of the present disclosure are not limited thereto and determining boundaries of candidate partitioned blocks can be achieved through various methods.

Figure 5:
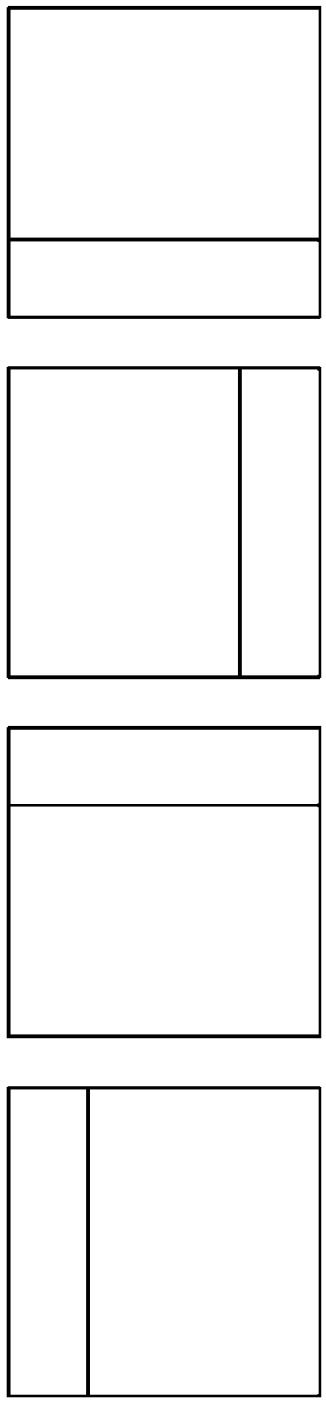
FIG. 5 is an exemplary diagram of partitioning a block into rectangular blocks according to at least one embodiment of the present disclosure.

FIG. 5 is a diagram illustrating an example of a method of partitioning a block into rectangular blocks.

In FIG. 5, the block is partitioned into two blocks, wherein one block has a rectangular shape in 1/4 size of the block and the other block has a rectangular shape in 3/4 size of the block. Here, various embodiments of the present disclosure are not limited to the example of partitioning the block into blocks having the rectangular shape, but the block may be partitioned through various methods, and for example, one block may be partitioned into more than two rectangular shapes of partitioned blocks.

The block partitioning unit 110 can select a partition form of the block having an optimal encoding efficiency from four preset candidate partition forms shown in FIG. 5. A partition form having the best rate-distortion ratio can be determined as the partition form by comparing encoding costs of the four candidate partition forms shown in FIG. 5.

The prediction unit 120 acquires a reference block according to the optimal partition form determined by using information on the partition form generated by the block partitioning unit 110 and an optimal scale factor, and generates a predicted block.

The prediction unit 120 performs motion compensation in a reference picture of arbitrary sub samples (for example, sub samples of 1/4, 1/8, 1/16, or 1/32) by applying the scale factor of the luminance component to the blocks of the partition form determined by the block partitioning unit 110 and predicts the partition block so as to generate the predicted block. As a result of the motion compensation, the partition block is predicted by applying both an optimal motion vector and an optimal scale factor among a plurality of scale factors, so that the prediction can be performed while reflecting an image change by a camera motion such as a zoom-in, zoom-out or the like of the camera.

Figure 6:
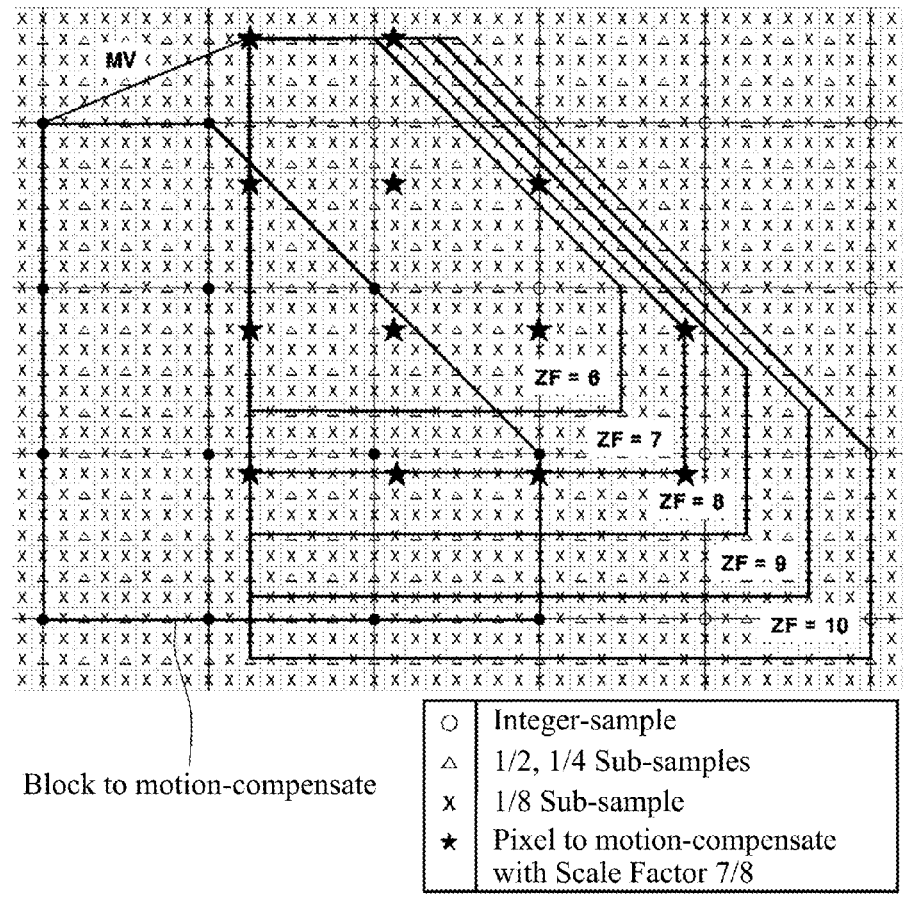
FIG. 6 is a schematic diagram of a case where motion compensation is performed through an enlargement or reduction by applying a scale factor to partition block in the motion compensation according to at least one embodiment of the present disclosure.

FIG. 6 is a diagram schematically illustrating a case where motion compensation is performed through enlargement or reduction by applying a scale factor to a partition block.

For example, there may be a partitioned block to be currently motion-compensated having a 4×4 block cut out at triangular upper right area thereof as illustrated in FIG. 6, wherein the motion compensation can be performed through an enlargement or reduction by applying a scale factor to the current partitioned block to encode, which provides a reference block according to an optimal partition form determined by using a determined optimal scale factor. For example, when sub samples up to 1/8 sub samples are used, the motion compensation can be performed with an original size (that is, ZF=8). Further, the motion compensation can be performed by reducing the distance between pixels to be motion-compensated by down scale factor 7/8 (that is, ZF=7), or the motion compensation can be performed by up scale factor 9/8 (that, ZF=9). In FIG. 6, with the scale factor of 7/8, the pixels subject to the motion compensation are identified as stars (★).

As described above, according to the motion compensation which is performed through the enlargement or reduction by applying the scale factor to the partition block to be currently encoded, an optimal scale factor which achieves an optimal prediction result can be acquired by performing the motion compensation by applying scale factors to various sub samples such as 1/2, 1/4, 1/16, and 1/32 sub samples as well as the 1/8 sub samples. For example, with respect to the 1/4 sub sample, a 3/4 scale factor (that is, 3/4 times magnification), a 4/4 scale factor, and a 5/4 scale factor may be candidate scale factors. With respect to the 1/8 sub sample, a 6/8 scale factor, a 7/8 scale factor, a 1/8 scale factor, 9/8 scale factor, and a 10/8 scale factor may be candidate scale factors. Among the above listed scale factors, the scale factor having the best encoding cost can be selected as the optimal scale factor. Here, the mentioned scale factors for each sub sample are only exemplary, and various other candidate scale factors can be selected for each sub sample size. As described above, the motion vector and the scale factor generated as a result of the prediction can be transmitted to the encoder 160 and then encoded into the bitstream.

The subtractor 130 generates a residual block including a residual signal calculated from a difference value between the pixel value of the partition block to be encoded and the pixel value of the predicted block predicted by the prediction unit 120.

The transformer 140 generates a frequency transform block by transforming the residual block generated by the subtractor 130 to a frequency domain. Here, the transformer 140 can transform the residual block to the frequency domain by using various transform schemes which transform a video signal on a time axis to a video signal on a frequency axis, such as a Discrete Cosine Transform (hereinafter, referred to as a "DCT") and a wavelet transform.

The quantizer 150 quantizes the residual block (that is, frequency transform block) transformed to the frequency domain by the transformer 140. As a quantization method, various quantization schemes such as a Dead Zone Uniform Threshold Quantization (hereinafter, referred to as a "DZUTQ") or a quantization weighted matrix may be used.

The encoder 160 encodes the transform block quantized by the quantizer 150 into the bitstream. Such encoding technology may be an entropy encoding technology, although the present disclosure is not limited to thereto among other various encoding technologies.

In addition, the encoder 160 can insert various information required for decoding the encoded bitstream as well as the bitstream encoded from quantized frequency coefficients into encoded data. That is, the encoded data may include a field containing a coded block pattern (CBP), a delta quantization parameter, and the bitstream encoded from the quantized frequency coefficients and a field containing a bit for information required for the prediction (for example, an intra-prediction mode in the intra-prediction or a motion vector in the inter-prediction).

In addition, the encoder 160 can encode information on the partition form determined by the block partitioning unit 110 and the optimal scale factor of the partition block generated by the prediction unit 120 as well as the motion vector required for decoding the encoded bitstream, into the bitstream. Here, as described above, information on the angle and the length may be used for the information on the partition form, but the present disclosure is not limited thereto and information on the angle and the length (or the start position (that is, y-intercept or x-intercept) and the slope of the partition boundary) may be encoded by using an encoding table. For example, in the 8×8 block, 28 angles are generated by connecting one arbitrary point within the block and twenty eight peripheral pixels, and bits may be allocated with reference to an angle encoding table in which each of the twenty eight angles is matched with the corresponding encoding bits. For encoding a length, the bits to be encoded may be allocated with reference to a length encoding table in which the number of horizontal or vertical pixels for the corresponding angle is matched with the corresponding encoding bits. When the partition boundary is denoted by the start position (that is, y-intercept or x-intercept) and the slope of the partition boundary, the bits to be encoded may be allocated with reference to a partition boundary start position (y-intercept or x-intercept) encoding table and a slope encoding table.

Further, in the case where the 1/8 sub sample is used, when scale factors from a 1/8 ratio to a 16/8 ratio can be applied as the candidate scale factors, bits which encode the corresponding scale factor may be allocated with reference to a scale factor encoding table in which the determined scale factor is matched with the encoding bits.

The dequantizer and inverse transformer 170 reconstructs the residual block by dequantizing and inversely transforming the transformed and quantized residual block (that is, quantized transform block). Here, the dequantization and the inverse transform may be achieved by inversely performing the transform process by the transformer 140 and the quantization process by the quantizer 150, respectively. That is, the dequantizer and inverse transformer 170 can perform the dequantization and the inverse transform by using information on the transform and quantization generated by and transmitted from the transformer 140 and the quantizer 150.

The adder 180 generates a reconstructed block by adding the predicted block generated by the prediction unit 120 and the residual block reconstructed by the dequantizer and inverse transformer 170.

The frame memory 190 stores the block reconstructed by the adder 180, and the reconstructed block is used as a reference block to generate a predicted block in the intra or inter-prediction.

Figure 7:
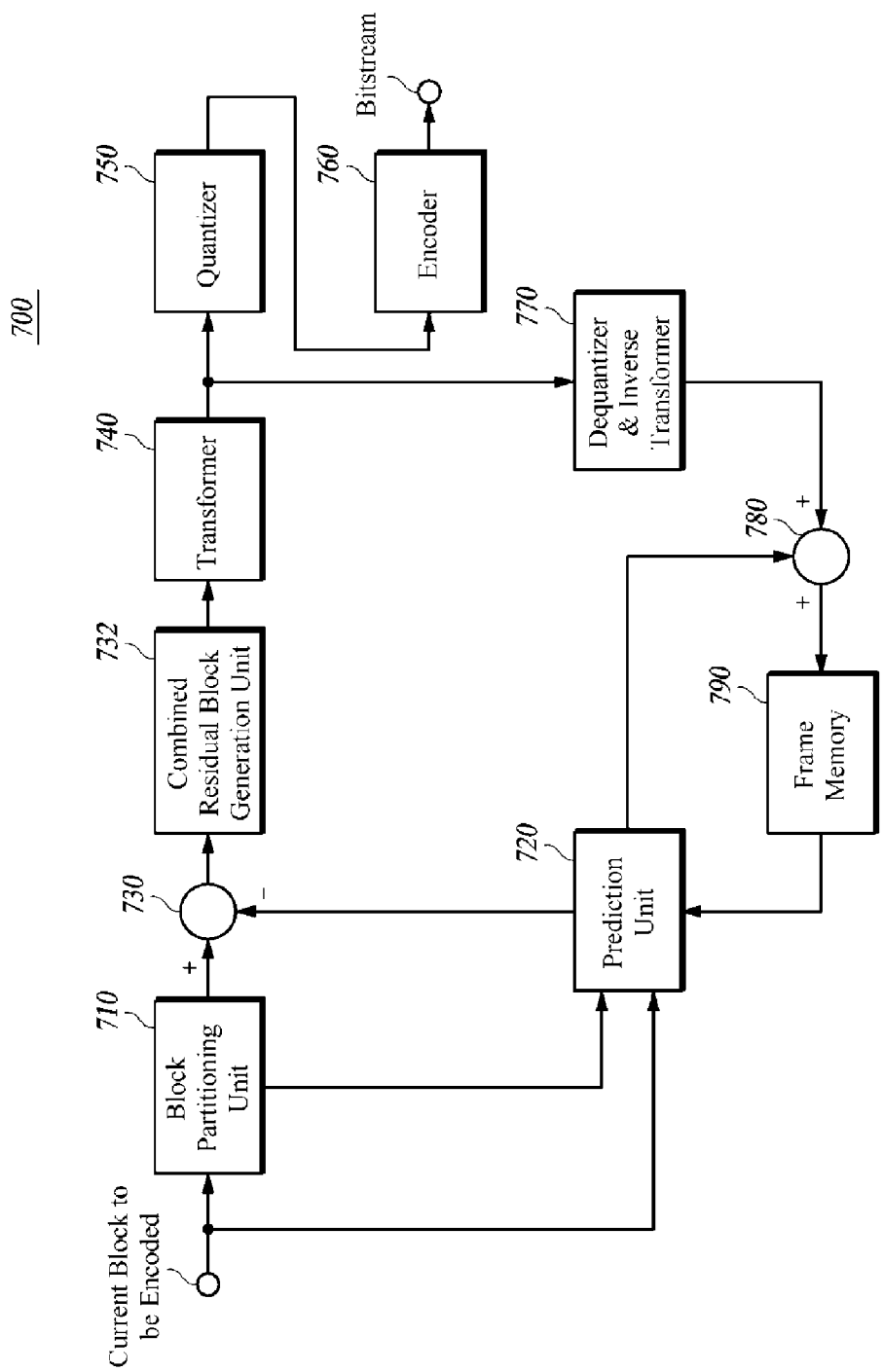
FIG. 7 is a block diagram of a configuration of a video encoding apparatus according to at least another embodiment of the present disclosure.

FIG. 7 is a schematic block diagram of a video encoding apparatus according to at least another embodiment of the present disclosure.

The video encoding apparatus 700 according to at least another embodiment of the present disclosure is an apparatus for encoding a video by calculating a motion vector and a scale factor by using a luminance component of a block to be currently encoded, and may comprise a block partitioning unit 710, a prediction unit 720, a subtractor 730, a combined residual- block generation unit 732, a transformer 740, a quantizer 750, an encoder 760, a dequantizer and inverse transformer 770, an adder 780, and a frame memory 790 as illustrated in FIG. 7. Here, since operations of the block partitioning unit 710, prediction unit 720, subtractor 730, quantizer 750, encoder 760, dequantizer and inverse transformer 770, adder 780 and frame memory 790 are equal or similar to the operations of the block partitioning unit 110, prediction unit 120, subtractor 130, quantizer 150, encoder 160, dequantizer and inverse transformer 170, adder 180 and frame memory 190 of FIG. 1, detailed descriptions thereof will be omitted.

The combined residual block generation unit 732 generates a combined residual block by combining residual blocks of respective partition blocks. For example, in a partition block partitioned to have an arbitrary partition form which is not a rectangle, the combined residual block is generated such that a frequency transform is performed after an original sized block is generated by combining all residual blocks of respective partition blocks, not performing the frequency transform for each of the residual blocks.

At this time, the transformer 740 generates a frequency transform block by transforming the combined residual block.

Figure 8:
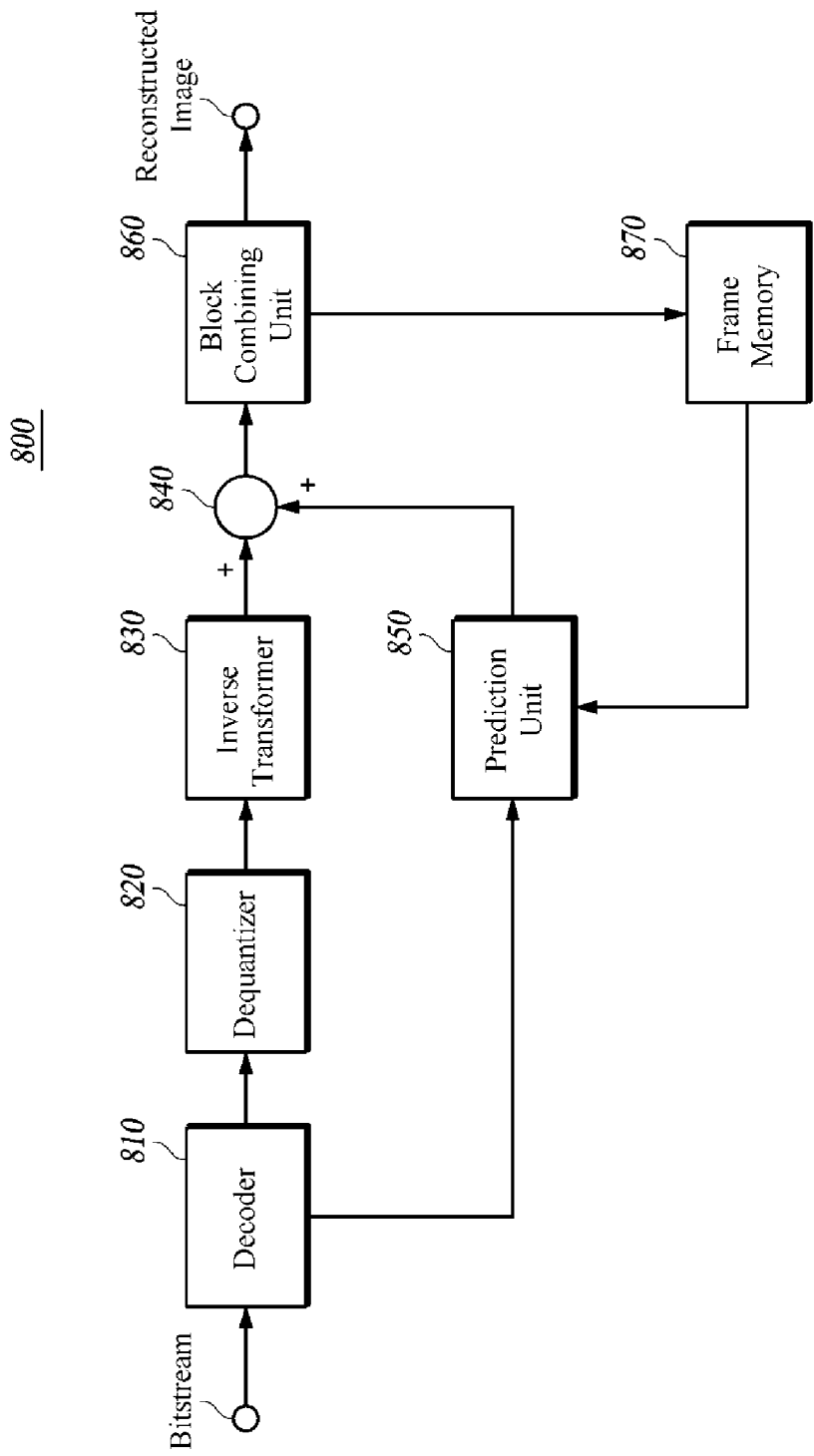
FIG. 8 is a block diagram of a configuration of a video decoding apparatus according to at least one embodiment of the present disclosure.

FIG. 8 is a schematic block diagram of a configuration of a video decoding apparatus according to at least one embodiment of the present disclosure.

As illustrated in FIG. 8, the video decoding apparatus 800 according to at least one embodiment of the present disclosure includes a decoder 810, a dequantizer 820, an inverse transformer 830, an adder 840, a prediction unit 850, a block combining unit 860, and a frame memory 870.

The decoder 810 reconstructs the quantized transform block, information on the partition form, and the scale factor from the bitstream.

The decoder 810 can decode or extract information required for the decoding as well as the quantized frequency transform block by decoding the encoded data (bitstream). The information required for the decoding refers to information required for decoding the encoded bitstream within the encoded data (that is, bitstream), and may include, for example, information on a block type, information on the motion vector, information on a transform and quantization type, and other various information.

That is, the decoder 810 extracts the quantized frequency transform block including pixel information on the current block of the video by decoding the bitstream which is the data encoded by the video encoding apparatus, and transmits the extracted information required for the prediction to the prediction unit 850.

The prediction unit 850 can generate a partitioned prediction block by using the decoded information on the partition form and the scale factor. That is, the decoder 810 can generate the predicted block by using a pixel of which a position is changed (reduced or enlarged) by a size of the scale factor for a reference block indicated by the decoded motion vector.

The dequantizer 820 dequantizes the quantized frequency transform block extracted from the bitstream by the decoder

810. The inverse transformer 830 inversely transforms the frequency transform block dequantized by the dequantizer 820 to a spatial area.

The adder 840 reconstructs an original pixel value of the partition block by adding the residual signal reconstructed through the inverse transform by the inverse transformer 830 and the predicted pixel value generated by the prediction unit 850. The current block reconstructed by the adder 840 is transmitted to the frame memory 870, and then may be used to predict another block by the prediction unit 850.

The block combining unit 860 reconstructs the current block by combining reconstructed partition blocks.

The frame memory 870 stores a reconstructed video to allow an intra-prediction block or an inter-prediction block to be generated.

For reference, the partition form may be determined by partitioning the current block by a straight line which connects two arbitrary points of the peripheral pixels of the current block. One partition block may have a rectangular shape in 1/4 size of the current block, and another partition block may have a rectangular shape in 3/4 size of the current block. Since the description has been provided on the partition forms above, the same detailed description will not be repeated.

As discussed in the description of the video encoding apparatus 100, the partition boundary of the partition block may be specified by the slope and the start position of the partition boundary. Further, in decoding the information on the partition form, the decoder 810 can reconstruct the encoded information on the slope of the partition boundary and the start position of the partition boundary with reference to the same encoding table as that (the angle encoding table and the length encoding table) for the partition form used in the video encoding apparatus 100. In addition, the scale factor also can be reconstructed with reference to the same scale factor encoding table as that used in the video encoding apparatus 100. Furthermore, the scale factor may be used for the prediction by using a scale corresponding to one integer multiple among sizes 1/4, 1/8, 1/16 and 1/32 of the current block.

Figure 9:
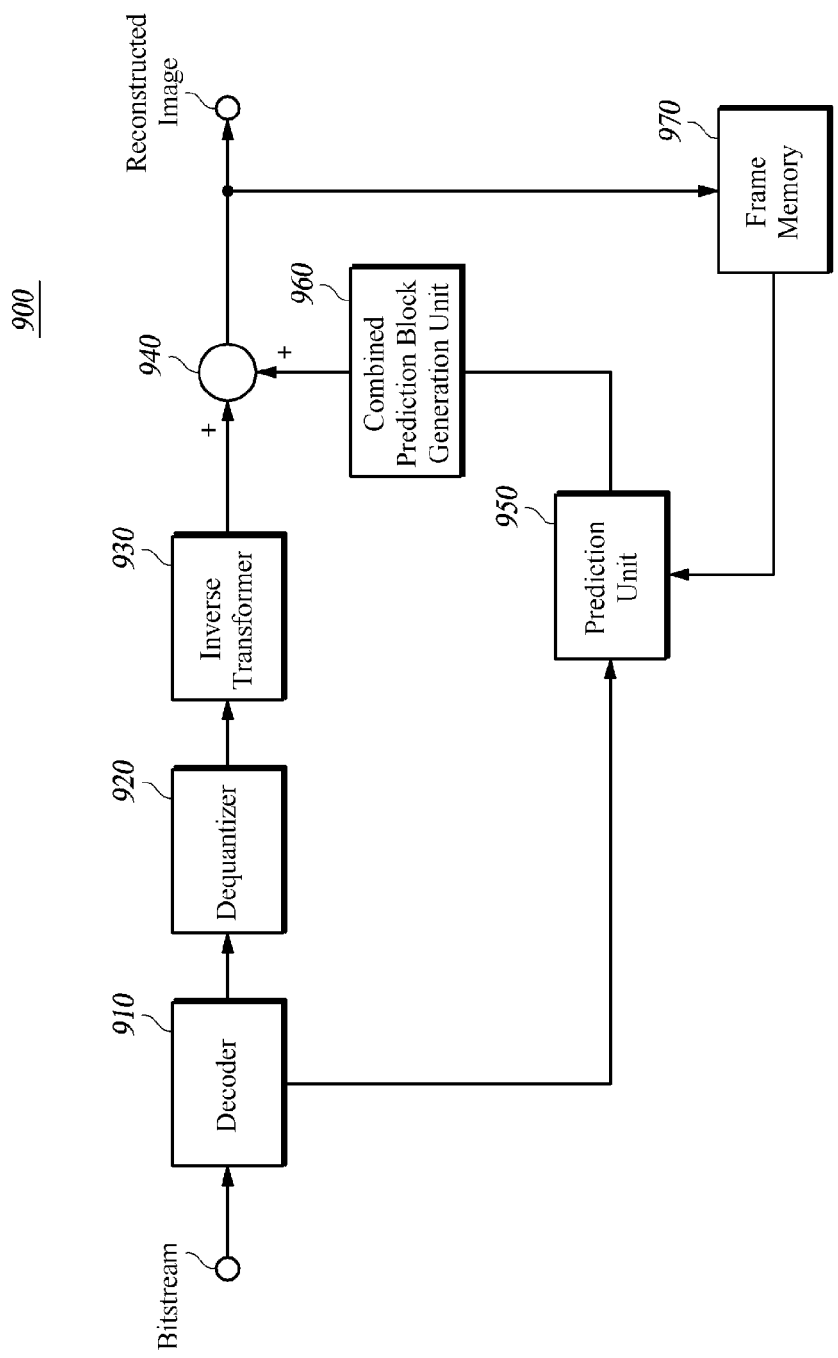
FIG. 9 is a block diagram of a configuration of a video decoding apparatus according to at least another embodiment of the present disclosure.

FIG. 9 is a block diagram of a configuration of a video decoding apparatus according to at least another embodiment of the present disclosure.

As illustrated in FIG. 9, the video decoding apparatus 900 according to at least one embodiment of the present disclosure includes a decoder 910, a dequantizer 920, an inverse transformer 930, an adder 940, a prediction unit 950, a combined prediction block generation unit 960, and a frame memory 970. Here, since operations of the decoder 910, dequantizer 920, inverse transformer 930, prediction unit 950 and frame memory 970 are equal or similar to the operations of the decoder 810, dequantizer 820, inverse transformer 830, prediction unit 850 and frame memory 870 of FIG. 8, detailed descriptions thereof will be omitted.

The combined prediction block generation unit 960 generates a combined prediction block by combining partitioned prediction blocks generated by the prediction unit 950 according to the decoded partition form. That is, the combined prediction block becomes the predicted block of the current block to be reconstructed.

The adder 940 reconstructs the current block by adding the reconstructed residual block and the combined prediction block. The frame memory 970 stores a reconstructed video to allow an intra-prediction block and an inter-prediction block to be generated.

A video encoding and decoding apparatus according to at least one embodiment of the present disclosure may be implemented by connecting a bitstream output terminal of the video encoding apparatus 100 of FIG. 1 or 700 of FIG. 7 with a bitstream input terminal of the video decoding apparatus 800 of FIG. 8 or 900 of FIG. 9.

A video encoding and decoding apparatus according to at least one embodiment of the present disclosure includes a video encoder for determining a partition form having an optimal encoding efficiency among one or more candidate partition forms in which a current block to be encoded is partitioned into arbitrary shapes, for generating a predicted block by performing a motion compensation with an application of an optimal scale factor to the determined partition form of one or more partition blocks, for generating one or more residual blocks by subtracting the predicted block from the partition block, for transforming the residual block or transforming a combined residual block generated by combining the residual blocks of respective partition blocks, for quantizing a transform block, and for encoding the quantized transform block, information on the determined partition form and the optimal scale factor into a bitstream. The video encoding and decoding apparatus further includes a video decoder for reconstructing a quantized transform block, information on a partition form and a scale factor by decoding a bitstream, for reconstructing a transform block by dequantizing the quantized transform block, for reconstructing a residual block by inversely transforming the transform block, for generating one or more partitioned prediction blocks by using the information on the partition form and the scale factor, and for reconstructing a partition block by adding the reconstructed residual block and the partitioned prediction block or for reconstructing a current block by adding the reconstructed residual block and a combined prediction block generated by combining the partitioned prediction blocks by the partition form.

Here, the video encoder may be implemented by the video encoding apparatus 100 or 700, and the video decoder may be implemented by the video decoding apparatus 800 or 900.

Figure 10:
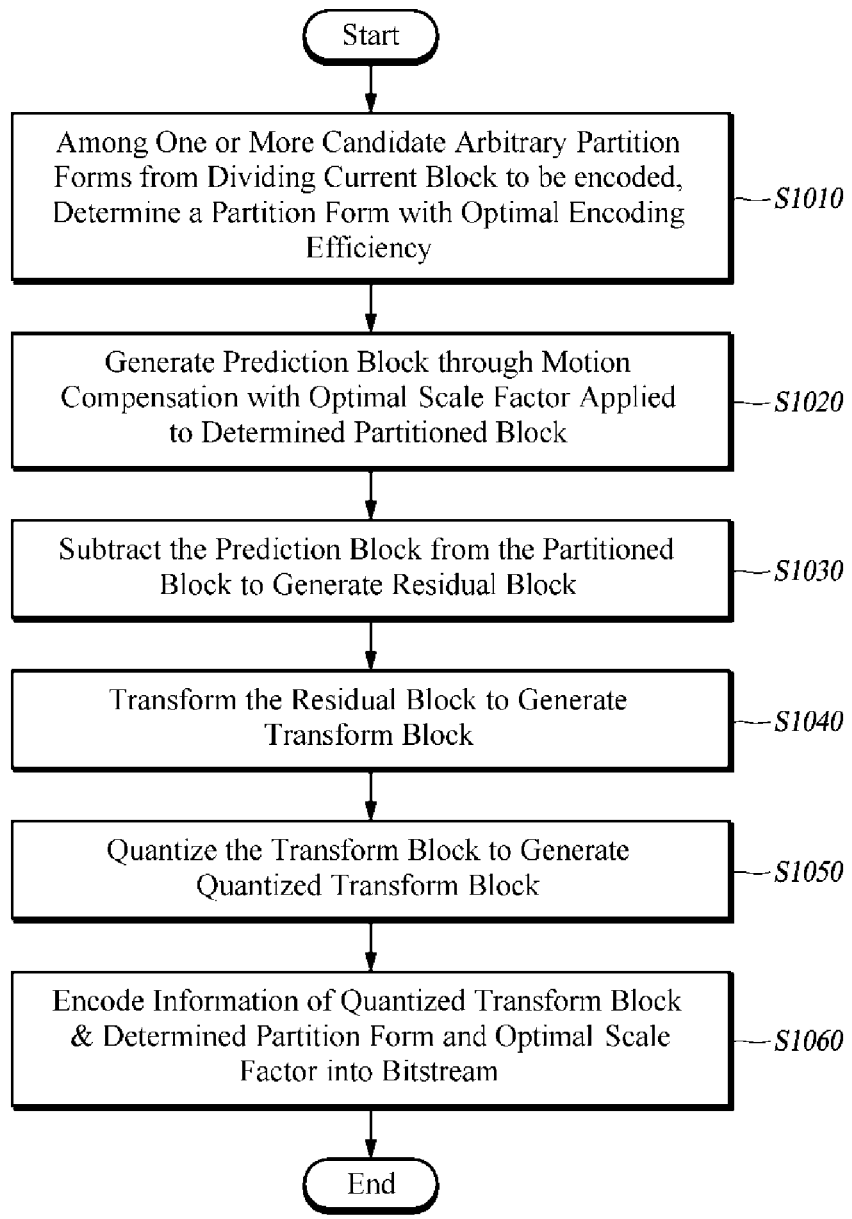
FIG. 10 is a flowchart of a video encoding method according to at least one embodiment of the present disclosure.

FIG. 10 is a flowchart of a video encoding method according to at least one embodiment of the present disclosure.

The video encoding method according to at least one embodiment of the preset disclosure encodes a video through a block partitioning step S1010, a prediction step S1020, a subtraction step S1030, a transform step S1040, a quantization step S1050 and an encoding step S1060. The block partitioning step S1010 determines a partition form having an optimal encoding efficiency among one or more candidate partition forms in which a current block to be encoded is partitioned into arbitrary shapes. The prediction step S1020 generates a predicted block by performing a motion compensation with an application of an optimal scale factor to the determined partition form of one or more partition blocks. The subtraction step S1030 generates a residual block by subtracting the predicted block from the partition block. The transform step S1040 generates a transform block by transforming the residual block. The quantization step S1050 generates a quantized transform block by quantizing the transform block. Finally, the encoding step S1060 encodes the quantized transform block, information on the determined partition form and the optimal scale factor into a bitstream.

Here, since the block partitioning step S1010 corresponds to the operation of the block partitioning unit 110, prediction step S1020 to the operation of prediction unit 120, subtraction step S1030 to the operation of subtractor 130, transform step S1040 to the operation of transformer 140, quantization step S1050 to the operation of quantizer 150, and encoding step S1060 to the operation of encoder 160, detailed descriptions thereof will be omitted.

Figure 11:
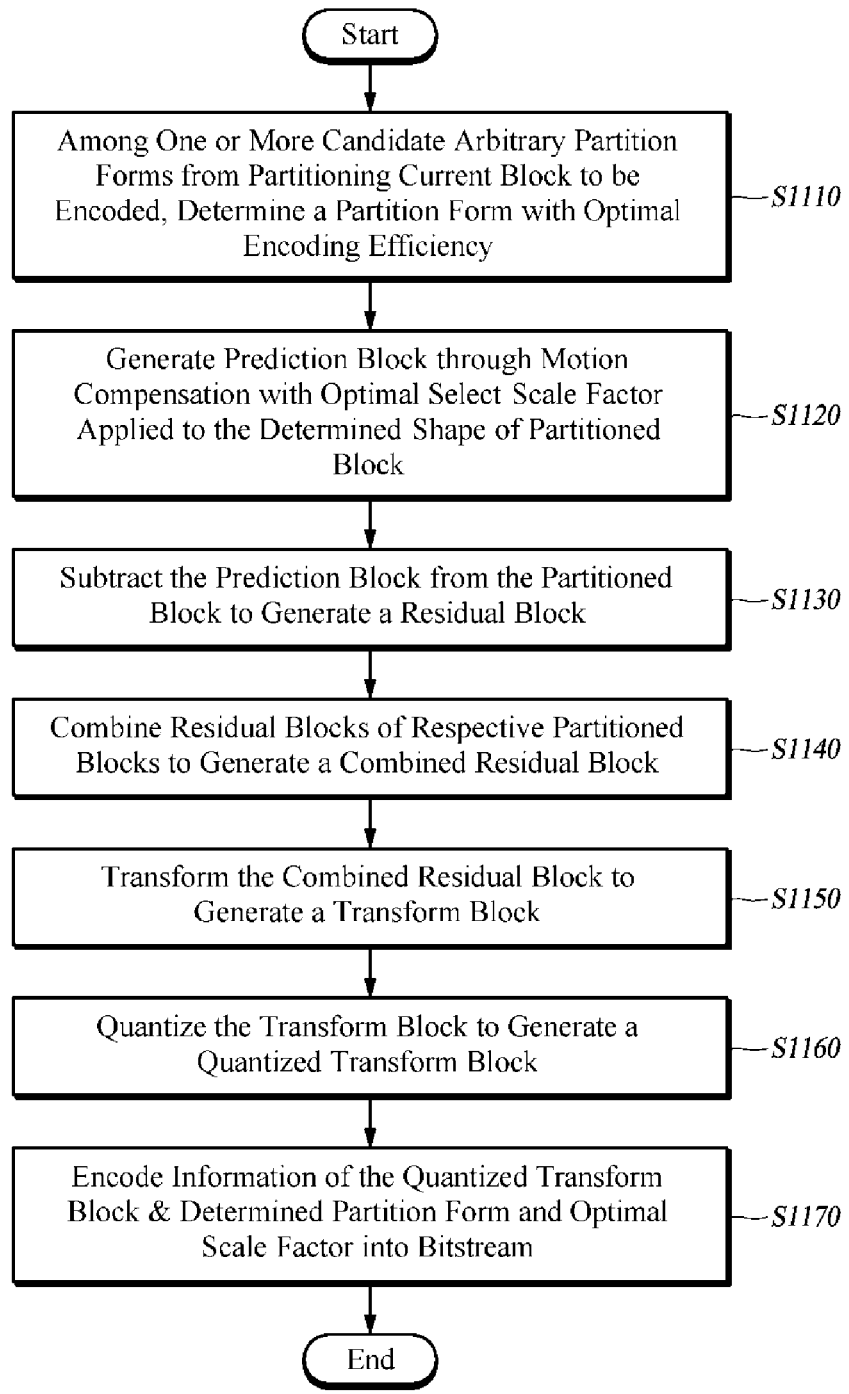
FIG. 11 is a flowchart of a video encoding method according to at least another embodiment of the present disclosure.

FIG. 11 is a flowchart of a video encoding method according to at least another embodiment of the present disclosure.

The video encoding method in this embodiment of the present disclosure includes a block partitioning step S1110, a prediction step S1120, a subtraction step S1130, a combined residual block generating step S1140, a transform step S1150, a quantization step S1160 and an encoding step S1170. The block partitioning step S1110 determines a partition form having an optimal encoding efficiency among one or more candidate partition forms in which a current block to be encoded is partitioned into arbitrary shapes. The prediction step S1120 generates a predicted block by performing a motion compensation with an application of an optimal scale factor to the determined form of at least one partition block. The subtraction step S1130 generates a residual block by subtracting the predicted block from the partition block. The combined residual block generating step S1140 generates a combined residual block by combining residual blocks of respective partition blocks. The transform step S1150 generates a transform block by transforming the residual block. The quantization step S1160 generates a quantized transform block by quantizing the transform block. Finally, the encoding step S1170 encodes the quantized transform block, information on the determined partition form and the optimal scale factor into a bitstream.

Here, the block partitioning step S1110 corresponds to the operation of the block partitioning unit 710, prediction step S1120 to the operation of prediction unit 720, subtraction step S1130 to the operation of subtractor 730, combined residual block generating step S1140 to the operation of combined residual block generation unit 732, transform step S1150 to the operation of operation of the transformer 740, quantization step S1160 to the operation of quantizer 750, and encoding step S1170 to the operation of encoder 760, detailed descriptions thereof will be omitted.

Figure 12:
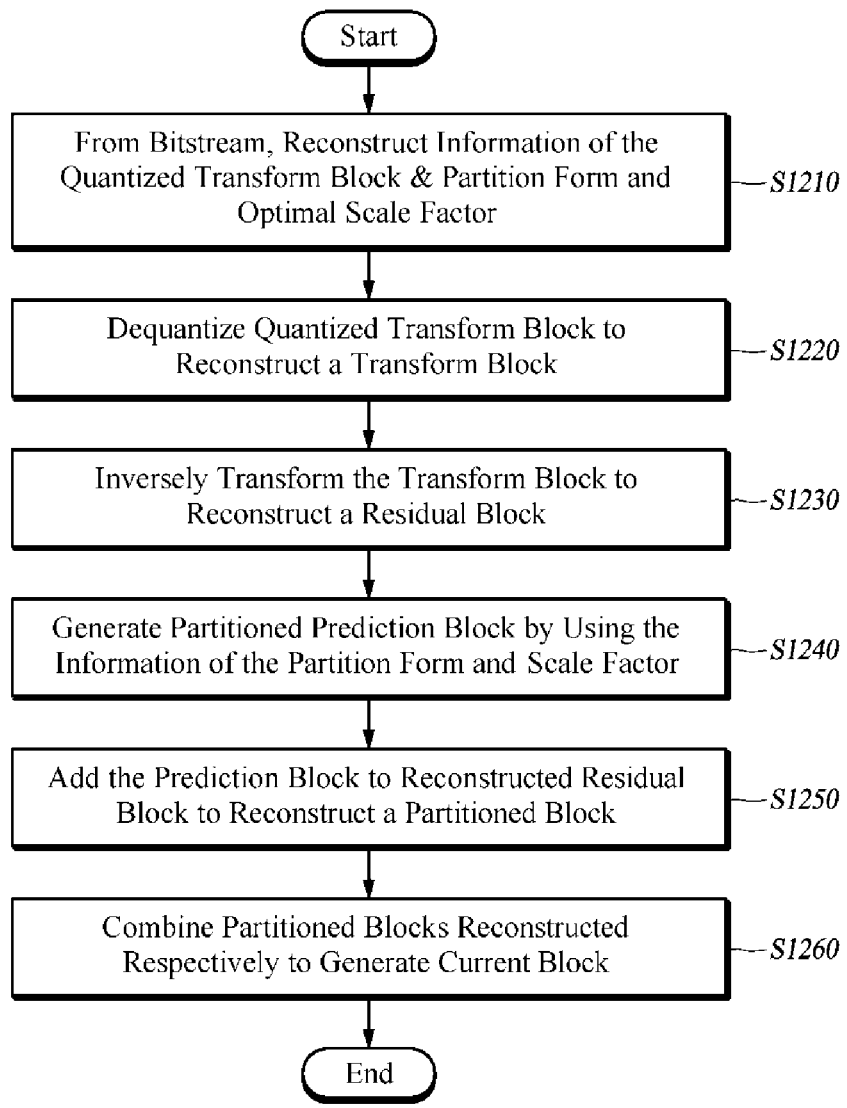
FIG. 12 is a flowchart of a video decoding method according to at least one embodiment of the present disclosure.

FIG. 12 is a flowchart of a video decoding method according to at least one embodiment of the present disclosure.

The video decoding method in this embodiment of the present disclosure decodes a video through a decoding step S1210 of reconstructing a quantized transform block, information on a partition form, and a scale factor from a bitstream (i.e., by decoding a bitstream), a dequantization step S1220 of reconstructing a transform block by dequantizing the quantized transform block, an inverse transform step S1230 of reconstructing a residual block by inversely transforming the transform block, a prediction step S1240 of generating a partitioned prediction block by using the information on the partition form and the scale factor, an addition step S1250 of reconstructing a partition block by adding a reconstructed residual block and a predicted block, and a block combining step S1260 of generating a current block by combining reconstructed partition blocks.

Here, the decoding step S1210 corresponds to the operation of the decoder 810, dequantization step S1220 to the operation of dequantizer 820, inverse transform step S1230 to the operation of inverse transformer 830, prediction step S1240 to the operation of prediction unit 850, addition step S1250 to the operation of adder 840, and block combining step S1260 to the operation of block combining unit 860, detailed descriptions thereof will be omitted.

Figure 13:
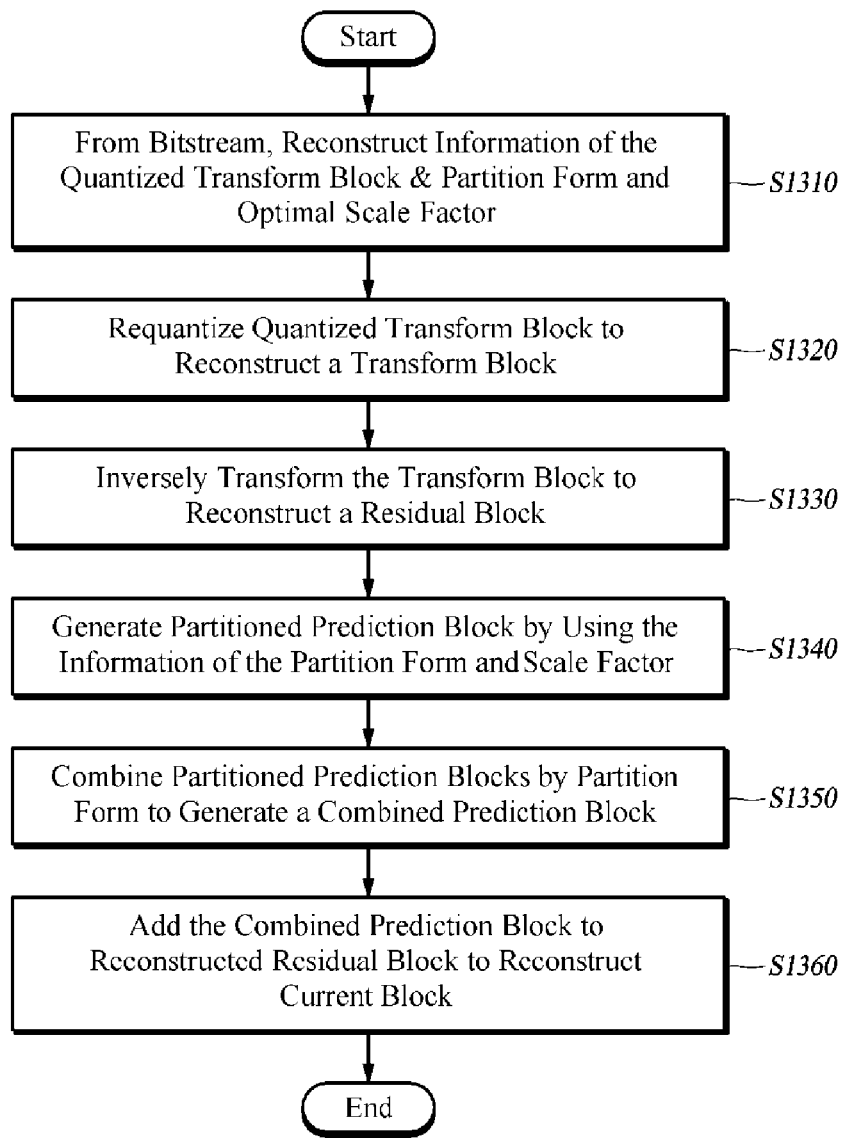
FIG. 13 is a flowchart of a video decoding method according to at least another embodiment of the present disclosure.

FIG. 13 is a flowchart of a video decoding method according to at least another embodiment of the present disclosure.

The video decoding method according to this embodiment of the present disclosure decodes a video through a decoding step S1310 of reconstructing a quantized transform block, information on a partition form, and a scale factor from a bitstream (i.e., by decoding a bitstream), a dequantization step S1320 of reconstructing a transform block by dequantizing the quantized transform block, an inverse transform step S1330 of reconstructing a residual block by inversely transforming the transform block, a prediction step S1340 of generating a partitioned prediction block by using the information on the partition form and the scale factor, a combined prediction block generating step S1360 of generating a combined prediction block by combining partitioned prediction blocks according to the partition form, and an addition step S1360 of reconstructing a current block by adding a reconstructed residual block and the combined prediction block.

Here, the decoding step S1310 corresponds to the operation of the decoder 910, dequantization step S1320 to the operation of dequantizer 920, inverse transform step S1330 to the operation of inverse transformer 930, prediction step S1340 to the operation of prediction unit 950, combined prediction block generating step S1350 to the operation of combined prediction block generation unit 960, and addition step S1360 to the operation of adder 940, detailed descriptions thereof will be omitted.

A video encoding and decoding method according to at least one embodiment of the present disclosure may be implemented by combining the aforementioned one video encoding method and the aforementioned one video decoding method.

A video encoding and decoding method according to at least one embodiment of the present disclosure includes encoding a video by determining a partition form having an optimal encoding efficiency among one or more candidate partition forms in which a current block to be encoded is partitioned into arbitrary shapes, generating a predicted block by performing a motion compensation with an application of an optimal scale factor to the determined partition form of one or more partition blocks, generating one or more residual blocks by subtracting the predicted block from the partition block, transforming the residual block or transforming a combined residual block generated by combining the residual blocks of respective partition blocks, quantizing a transform block, and encoding the quantized transform block, information on the determined partition form and the optimal scale factor into a bitstream. The video encoding and decoding method further includes decoding a video by reconstructing a quantized transform block, information on a partition form and a scale factor from a bitstream (i.e., by decoding a bitstream), reconstructing a transform block by dequantizing the quantized transform block, reconstructing a residual block by inversely transforming the transform block, generating one or more partitioned prediction blocks by using the information on the partition form and the scale factor, and reconstructing a partition block by adding the reconstructed residual block and the partitioned prediction block or reconstructing a current block by adding the reconstructed residual block and a combined prediction block generated by combining the partitioned prediction blocks by the partition form.

As described above, the present disclosure is highly useful for generating a great effect in a video encoding and decoding by minimizing a difference between an original current block and a predicted current block by predicting a shape and a size suitable for predicting a current block of an image from a reference block and encoding and decoding the current block.

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the various characteristics of the disclosure. That is, it is understood that the present disclosure should not be limited to these embodiments but various changes and modifications can be made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have not been described for limiting purposes. Accordingly, the scope of the claimed invention is not to be limited by the above embodiments but by the claims and the equivalents thereof.

What is claimed is:

1. A video encoding apparatus, comprising:
    a block partitioning unit configured to determine a partition form, among candidate partition forms, for partitioning a current block into one or more partition blocks, wherein the candidate partition forms include one or more asymmetric partition forms in which the current block is partitioned into a plurality of asymmetric partition blocks;
    a prediction unit configured to generate one or more predicted blocks respectively corresponding to the one or more partition blocks;
    a subtractor configured to generate a residual block of the current block by subtracting the predicted blocks from one or more partition blocks corresponding thereto;
    a transformer configured to generate at least one transform block by transforming the residual block;
    a quantizer configured to generate at least one quantized transform block by quantizing the at least one transform block; and
    an encoder configured to encode the at least one quantized transform block and information on the determined partition form into a bitstream,
    wherein the prediction unit is configured to
        determine a scale factor, and
        predict a partition block partitioned from the current block, by deriving predicted pixels from a reference picture in a scale corresponding to the scale factor from a pixel location indicated by a motion vector of the partition block, and
    wherein the encoder is configured to encode information on the scale factor into the bitstream to enable a video decoding apparatus to derive the predicted pixels from the reference picture in a scale corresponding to the information on the scale factor.

2. The video encoding apparatus of claim 1, wherein the information on the determined partition form is encoded with reference to a partition form encoding table.

3. The video encoding apparatus of claim 1, wherein the information on the scale factor is encoded with reference to a scale factor encoding table.

4. The video decoding apparatus of claim 1, wherein the asymmetric partition forms include partition forms for partitioning the current block into two partition blocks, one of the two partition blocks having a rectangular shape in 1/4 size of the current block and the other block having a rectangular shape in 3/4 size of the current block.

5. A video decoding apparatus, comprising:
    a decoder configured to reconstruct at least one quantized transform block, information on a partition form and information on a scale factor from the bitstream, and
    a dequantizer configured to reconstruct at least one transform block by dequantizing the at least one quantized transform block;
    an inverse transformer configured to reconstruct a residual block of a current block to be decoded, based on inversely transforming the at least one transform block;
    a prediction unit configured to generate one or more partitioned prediction blocks of the current block partitioned according to a partition form indicated by the information on the partition form among candidate partition forms, wherein the candidate partition forms include one or more asymmetric partition forms in which the current block is partitioned into a plurality of asymmetric partition blocks; and
    an adder configured to reconstruct the current block based on the reconstructed residual block and the prediction blocks,
    wherein the prediction unit is configured to predict a partition block partitioned from the current block, by deriving predicted pixels from a reference picture in a scale corresponding to the information on the scale factor from a pixel location indicated by a motion vector of the partition block.

6. The video decoding method of claim 5, wherein the asymmetric partition forms include partition forms for partition forms is for partitioning the current block into two partition blocks, one of the two partition blocks having a rectangular shape in 1/4 size of the current block and other block having a rectangular shape in 3/4 size of the current block.

7. A video decoding method performed by a video decoding apparatus, the method comprising:
- reconstructing at least one quantized transform block, information on a partition form and information on a scale factor from the bitstream;
- reconstructing at least one transform block by dequantizing the least one quantized transform block;
- reconstructing a residual block of a current block to be decoded, based on inversely transforming the least one transform block;
- generating a prediction block of the current block by predicting one or more partition blocks which are partitioned from the current block according to a partition form indicated by the information on the partition form among candidate partition forms, wherein the candidate partition forms include one or more asymmetric partition forms in which the current block is partitioned into a plurality of asymmetric partition blocks; and
- reconstructing the current block based on the reconstructed residual block and the prediction block,
- wherein the generating of one or more partitioned prediction blocks comprises predicting a partition block partitioned from the current block, by deriving predicted pixels from a reference picture in a scale corresponding to the information on the scale factor from a pixel location indicated by a motion vector of the partition block.

* * * * *